United States Patent [19]

Yamamoto

[11] Patent Number: 4,736,662

[45] Date of Patent: Apr. 12, 1988

[54] OPTICAL SENSOR FOR SENSING DISPLACEMENT SPEED OR DISPLACEMENT OF A MOVEABLE ELEMENT IN MUSICAL INSTRUMENT

[75] Inventor: Jun Yamamoto, Hamamatsu, Japan

[73] Assignee: Nippon Gakki Seizo Kabushiki Kaisha, Hamamatsu, Japan

[21] Appl. No.: 928,671

[22] Filed: Nov. 6, 1986

Related U.S. Application Data

[63] Continuation of Ser. No. 746,190, Jun. 18, 1985, abandoned.

[30] Foreign Application Priority Data

Jun. 19, 1984 [JP] Japan ............................. 59-90161[U]
Jun. 25, 1984 [JP] Japan ............................. 59-95127[U]
Jun. 25, 1984 [JP] Japan ............................. 59-95129[U]

[51] Int. Cl.$^4$ ............................................. G10H 1/34
[52] U.S. Cl. ........................................ 84/1.09; 84/1.1; 84/DIG. 7; 250/227
[58] Field of Search ................. 84/1.09, 1.1, 1.18, 84/1.27, DIG. 7; 250/227

[56] References Cited

U.S. PATENT DOCUMENTS

| | | | |
|---|---|---|---|
| 4,321,463 | 3/1982 | Stecher | 84/1.18 X |
| 4,362,934 | 12/1982 | McLey | 84/1.1 X |
| 4,429,607 | 2/1984 | Meno | 84/1.18 |
| 4,442,750 | 4/1984 | Bowley | 84/1.18 |
| 4,468,999 | 9/1984 | Bonanno | 84/1.1 |

FOREIGN PATENT DOCUMENTS 56-33718 8/1981 Japan .

Primary Examiner—Stanley J. Witkowski
Attorney, Agent, or Firm—Blakely Sokoloff Taylor & Zafman

[57] ABSTRACT

In an optical sensor for displacement speed/displacement of a movable element in a musical instrument, light emitted from a light-emitting element is guided to a sensor head through a transmission optical fiber and is further guided to a light-receiving element through a reception optical fiber. The sensor head is located at a position corresponding to a shutter movable in accordance with the movable element in the musical instrument. The shutter controls photocoupling and nonphotocoupling between the transmission and reception optical fibers. The sensor is of transmission or reflection type.

42 Claims, 8 Drawing Sheets

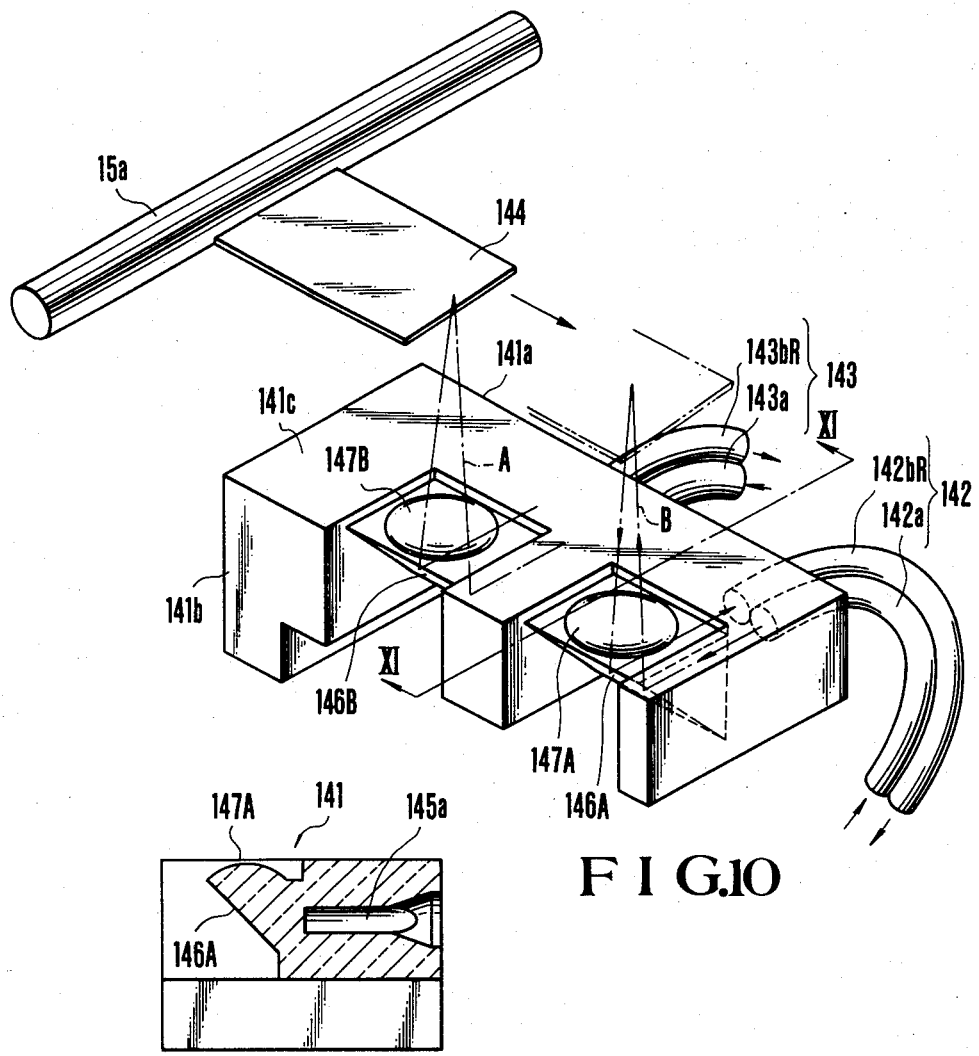
FIG.10
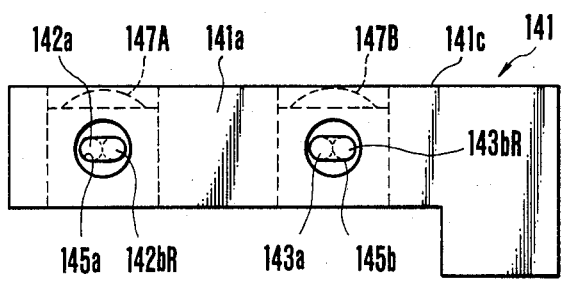
FIG.11
FIG.12

OPTICAL SENSOR FOR SENSING DISPLACEMENT SPEED OR DISPLACEMENT OF A MOVEABLE ELEMENT IN MUSICAL INSTRUMENT

This is a continuation of application Ser. No. 746,190 filed June 18, 1985 and now abandoned.

BACKGROUND OF THE INVENTION

The present invention relates to an optical sensor for detecting a displacement and a displacement speed of a movable element in a musical instrument.

In natural musical instruments such as in a piano and a percussion instrument, a depression speed (or force) on a keyboard, or a force of a stick striking a head of a percussion instrument is the most important factor for producing a musical tone. When these natural musical instruments are formed into electronic instruments, the depression speed (force) is used as a parameter for producing a musical tone. For this purpose, demand has arisen for a sensor for accurately detecting a key depression force or a stick striking force. Various types of conventional sensors have been proposed.

In these musical instruments, however, such a sensor is arranged at a position where a musical tone is produced. In this sense, the mounting space of the sensor is often limited. For example, in an automatic playing piano or in an electronic musical instrument, sensors are respectively arranged near hammers operated in association with key depression operations or near keys arranged in a line. The mounting space of the sensor is limited to the width of each key along the horizontal direction and to a movable range of the key along the key depression direction, i.e., the vertical direction.

The sensor mounted in such a limited space must be compact, have high reliability and be easily maintained. In order to satisfy these needs, a combination of light-emitting and light-receiving elements can be utilized. In the combination, a shutter operated in association with key depression is arranged between a light-emitting element and a light-receiving element so as to cross the optical path between the light-emitting and light-receiving elements which are separated from each other.

A typical example is described in Japanese Patent Publication No. 56-33718 (issued on Jan. 27, 1977). A set of a light-emitting element 14 and a light-receiving element 15 is used, and a shutter 9 interlocked with depression of a key 1 is moved between the elements 14 and 15. More particularly, in FIGS. 1 to 3 of this Publication, when a player depresses the key 1, the key 1 is pivoted clockwise about a support member 2 as a fulcrum to move the shutter 9 upward to allow transmission of light L (FIG. 3). At the same time, a press member 3 is moved upward to pivot an arm 7 clockwise. Thus, a hammer 6 is pivoted together with the arm 7 to strike an upper portion 11a of a reflecting plate 11. When the hammer 6 strikes the upper portion 11a at high speed and returns to the initial position, the shutter 9 shields the optical path of the light L. The striking force of the hammer 6 changes in accordance with the strength of a depression force. Therefore, the same touch responsive characteristic as in a piano can be obtained. A time T (to be referred to as a shielding time) T for shielding the light L by the shutter 9 changes in accordance with the displacement speed of the hammer. More specifically, the higher the hammer speed is, the shorter the shielding time T is. Inversely, the lower the hammer speed is, the longer the shielding time T is. Therefore, the shielding time changes in accordance with the strength of key depression.

However, the combination consisting of the light-emitting and light-receiving elements comprises a large mechanism. Instead, a combination consisting of semiconductor elements can be made compact to some extent. However, a circuit board for mounting these elements is required. In addition, wirings on the circuit board and between the circuit board and other devices are required. As a result, the peripheral arrangement of the keys is complicated. In particular, when such a combination is replaced or wiring modifications are performed, the keys and the peripheral mechanism must be removed.

SUMMARY OF THE INVENTION

It is, therefore, a principal object of the present invention to provide a displacement speed or displacement sensor for a movable element in a musical instrument, wherein the sensor can be incorporated in a limited space.

It is another object of the present invention to provide a displacement speed or displacement sensor for a movable element in a musical instrument, wherein the peripheral arrangement of the movable element can be simplified.

It is still another object of the present invention to provide a displacement speed or displacement sensor for a movable element in a musical instrument, wherein layout design of parts operated in association with the movable element guarantees a sufficient margin.

It is still another object of the present invention to provide a displacement speed or displacement sensor for a movable element in a musical instrument, wherein the number of displacement speed-electrical signal converting elements required for detecting a displacement speed of the movable element can be decreased.

It is still another object of the present invention to provide a displacement speed or displacement sensor for a movable element in a musical instrument, wherein assembly can be simplified and maintenance is easy.

It is still another object of the present invention to provide a displacement speed or displacement sensor for a movable element in a musical instrument, wherein the constituting elements can be easily replaced.

In order to achieve the above objects of the present invention, there is provided a displacement speed or displacement sensor for a movable element in a musical instrument, comprising:

a plurality of sensor heads arranged in a single line each of which comprises delivering section connected to the light emitting means through transmission optical fiber means and receiving section connected to the light receiving means through reception optical fiber means, the delivering section delivering to the receiving section of an adjacent sensor head the light supplied from the light emitting means through the transmission optical fiber and receiving section receiving the delivered light from the receiving section of another adjacent sensor head and supplying the delivered light to the light receiving means through the reception optical fiber means and the transmission optical fiber means comprising first and second transmission optical fibers which are fitted to the delivering section with a predetermined distance apart and the reception optical fiber means comprising first and second reception optical fiber with the predetermined distance apart: and shutter means movable in accordance with the movable element for interrupting the delivered light corresponding to the first transmission optical fiber firstly and thereafter for interrupting the delivered light corresponding to the second transmission optical fiber so that displacement speed of the movable element is obtained by measuring a time interval between the first interruption and the next interruption.

BRIEF DESCRIPTION OF THE DRAWINGS

FIG. 10 is a perspective view showing another modification of the displacement sensor according to the present invention;

FIG. 11 is a sectional view of the sensor when taken along the line XI—XI of FIG. 10;

FIG. 12 is a plan view of the sensor when viewed from the optical fiber direction of FIG. 10;

DESCRIPTION OF THE PREFERRED EMBODIMENTS

Figure 1:
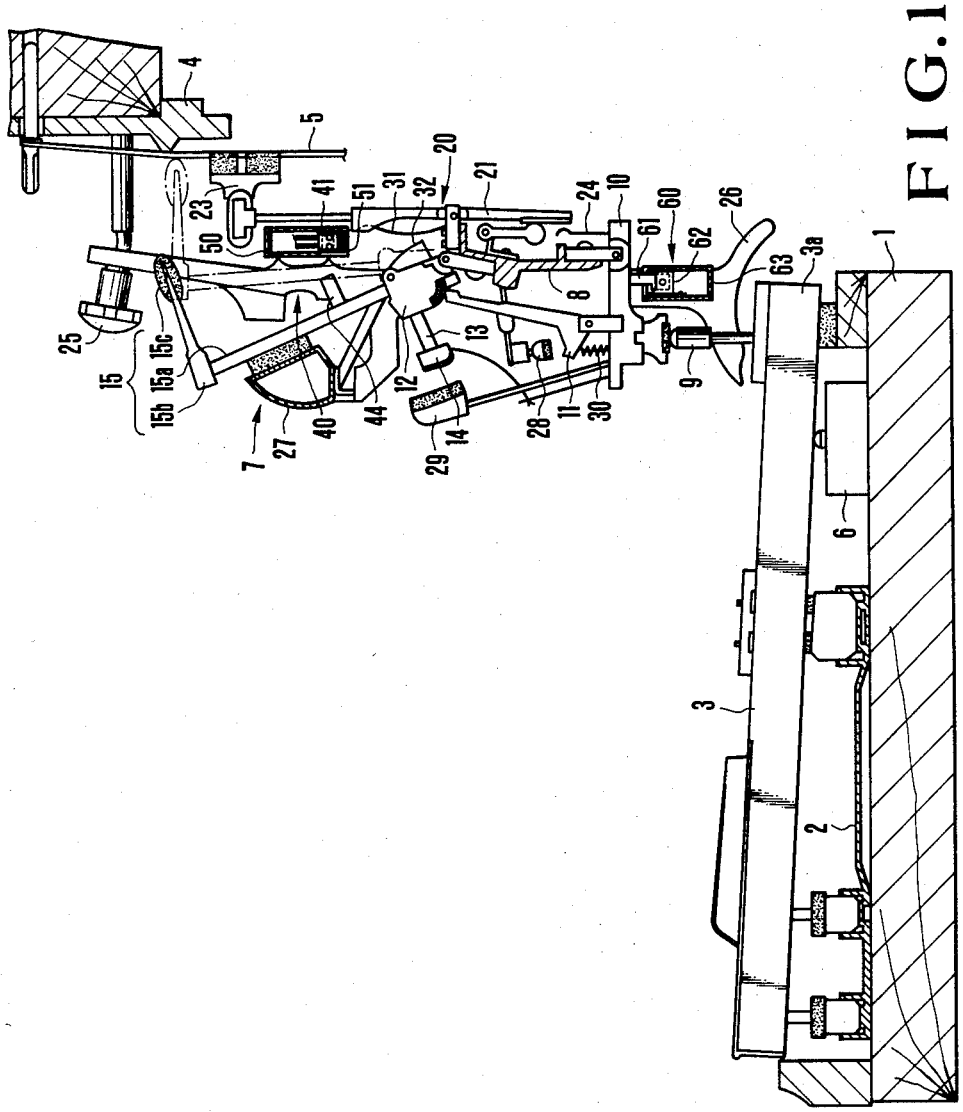
FIG. 1 is a partially cutaway side view showing a key and an action mechanism in an upright automatic playing piano which employs a displacement speed or displacement sensor for a hammer which is a movable element in the musical instrument according to an embodiment of the present invention.

FIGS. 1 to 4 show an embodiment wherein the present invention is applied to an upright automatic playing piano. Referring to FIG. 1, a keyboard 2 is arranged on a key bed 1. A large number of keys (e.g., 88 keys) 3 corresponding to strings 5 of respective pitches which are stretched on a frame 4 are arranged such that intermediate portions of the keys 3 are supported to be vertically pivotal. Keys 3 are normally depressed by fingers. During automatic musical performance, the keys 3 selectively continuously depress actuators 6 arranged on the key bed 1 as a player depresses the keys 3 with his fingers. This automatic playing apparatus itself is known, as disclosed in U.S. Pat. No. 4,469,000, although a detailed description thereof is omitted here.

An action mechanism 7, interlocked with depression of the key 3, includes: a wippen 10, one end of which is supported by a center rail 8 and which is pivoted interlocked with upward movement of a capstan 9 upon depression of the key 3; a jack 11 rotatably mounted on the wippen 10; a butt 12 pivotally supported by the center rail 8 and moved upward to be pivoted by the jack 11; a catcher 14 mounted on the butt 12 through the catcher shank 13; and a hammer 15 mounted on the butt 12. When the key is depressed, the wippen 10 is pivoted upward. When the jack 11 causes the butt 12 to move upward, the hammer 15 is pivoted together with the butt 12, thereby striking the string 5. The hammer 15 comprises a hammer shank 15a, a hammer wood 15b and a hammer felt 15c. The butt 12, the catcher shank 13 and the catcher 14 constitute a hammer assembly.

A known damper mechanism 20 interlocked with the action mechanism 7 is arranged in the center rail 8. The damper mechanism 20 includes: a damper 23 for urging the string 5 through a damper wire 22 to a damper lever 21 whose intermediate portion is pivotally supported by the center rail 8, thereby stopping the vibration of the string 5; and a damper spoon 24 extending from the pivoting portion of the wippen 10. The damper spoon 24 depresses the lower end portion of the damper lever 21 upon upward pivoting of the wippen 10 so as to separate the damper 23 from the string 5.

The center rail 8 is supported by a bracket 26. The bracket 26 extends upward from the key bed 1, and the upper end of the bracket 26 is connected and fixed by an action bolt 25 to the frame 4. Reference numeral 27 denotes a hammer rail; 28, a regulating button; 29, a back check; and 30, 31 and 32, retaining springs, respectively.

Figure 2:
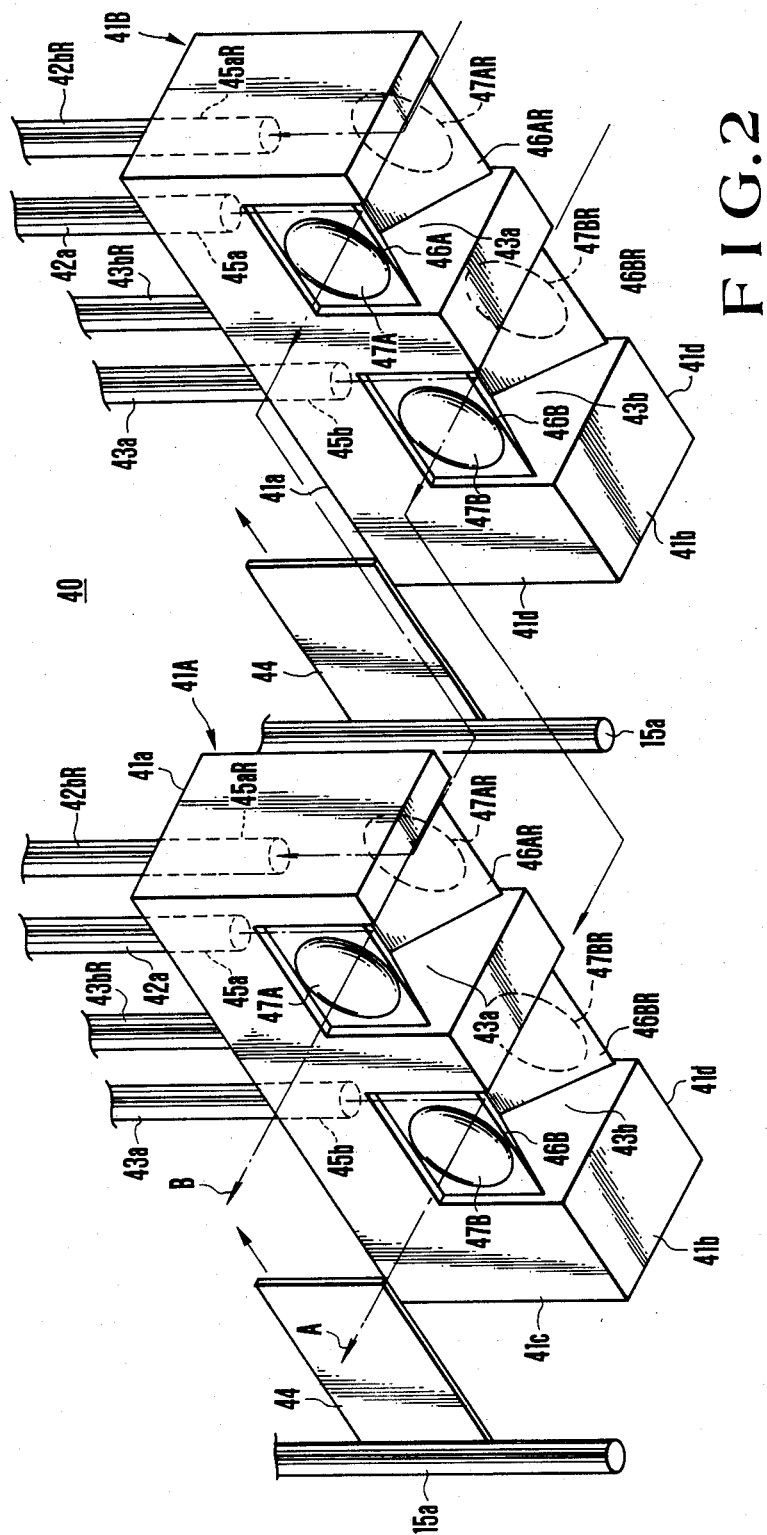
FIG. 2 is an enlarged perspective view showing part of the displacement speed or displacement sensor used in the instrument of FIG. 1.
Figure 3:
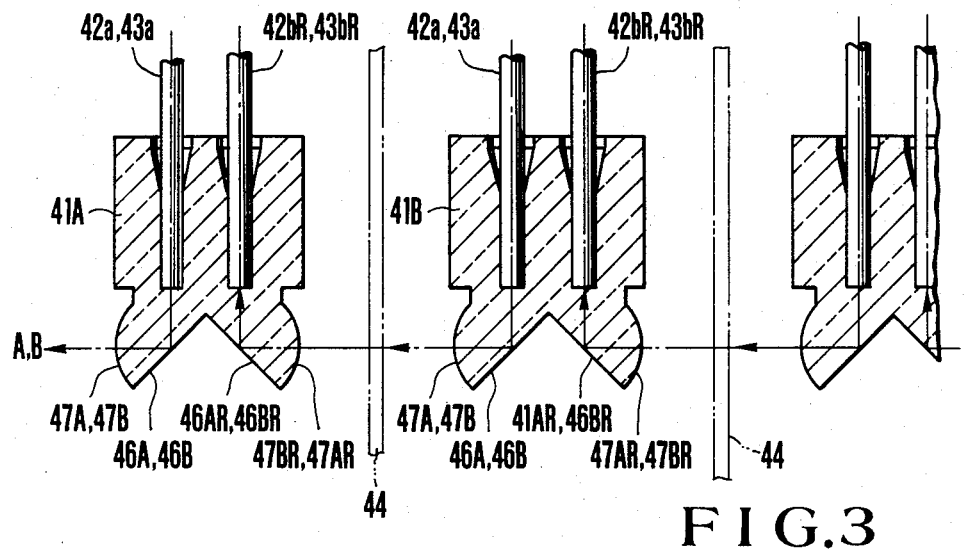
FIG. 3 is a sectional view showing the main part of the sensor of FIG. 2 so as to explain the operation thereof.
Figure 4:
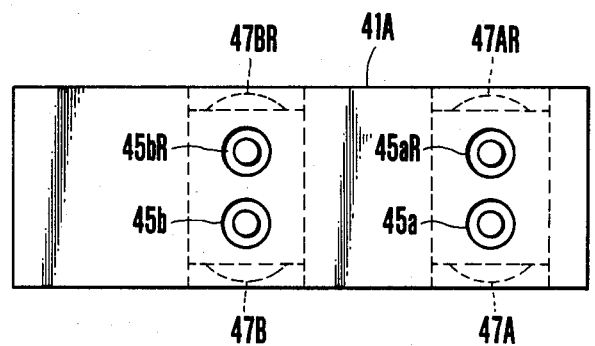
FIG. 4 is a plan view of the sensor shown in FIG. 2.

A performance information sensor 40 used in and featuring the present invention comprises a transmission type displacement speed or displacement sensor, and a detailed arrangement is illustrated in FIGS. 2 to 4. The sensor 40 is integrally formed of a transparent synthetic resin such as acrylic resin or polycarbonate. The sensor 40 has a pair of sensor heads 41A and 41B aligned in a line and spaced apart from each other by a predetermined distance. In this embodiment, the sensors 40 are aligned in a line in correspondence with the keys, so that the heads 41A and 41B are integrally formed in a plane symmetry. For example, when the head 41A is used as a transmission head, a portion adjacent to and integrally formed with the transmission head 41A is used as a reception head in the same manner as in the case wherein the heads 41A and 41B oppose and are separated from each other by a predetermined distance. In other words, when the structure of the head 41A is described, the structure of the head 41B has been described. Referring again to FIG. 2, the structure of the head 41A will be described. The head 41A has a box- or block-like shape as a whole. Substantially 90° V-shaped grooves 43a and 43b are formed in one surface 41b to be spaced apart from each other by a predetermined distance. Blind holes 45a and 45b spaced apart from each other by a predetermined distance are formed in a surface 41a located opposite to the surface 41b. Optical fibers 42a and 43a to be connected to light-emitting elements LE are inserted in the blind holes 45a and 45b, respectively. Light guided in the sensor head through the optical fibers 42a and 43a is reflected in a direction perpendicular to an incident direction by inclined surfaces 46A and 46B of the V-shaped grooves 43a and 43b. The light is emitted to the outside through focusing lenses 47A and 47B formed in surfaces perpendicular to the surfaces 41a and 41b. It should be noted that the blind holes have tapered portions so as to allow easy insertion of the optical fibers, respectively. The light is guided to the light-receiving head adjacent to the transmission head arranged at a predetermined distance therefrom.

The remaining surfaces 46AR and 46BR of the V-shaped grooves 43a and 43b constitute the light-receiving surfaces. The light emitted from the adjacent transmission head is guided in the reception head through focusing lenses 47AR and 47BR. The light is then guided by the surfaces 46AR and 46BR in a direction perpendicular to the incident direction. The light is then guided to light-receiving elements LR through optical fibers 42b and 43b inserted in blind holes 45aR and 45bR (not shown) formed in the surface 41a of the head. A shutter or a light-shielding plate 44 is arranged to cross the optical path between the transmission and reception heads. The shutter 44 is mounted at a proper portion of the hammer shank 15a, as shown in FIGS. 1 and 2. Light components A and B from the focusing lenses 47B and 47A are sequentially shielded by the shutter 44. It should be noted that the reflecting surfaces 46A and 46B and the reflecting surfaces 46AR and 46BR are inclined at an angle of 45° with respect to the optical fiber insertion direction.

The sensor head having the arrangement described is housed in a case 50 disposed at the upper end portion of the bracket 26 and behind the hammer shank 15a. At the same time, the sensor head is located at one side of the corresponding action mechanism. In this case, the sensor heads 41A and 41B are housed in the case 50 such that a surface 41d of the head 41A opposes a surface 41c of the head 41B and the focusing lenses 47A and 47B are aligned along the moving direction (back-and-forth direction) of the hammer 15.

The shutter 44 is mounted on the hammer shank 15a to cross the optical path between the sensor heads 41A and 41B. Normally, the shutter 44 is located in front (left) of the sensor heads 41A and 41B as shown in FIG. 1. Upon depression of the key, the sensor heads 41A and 41B are moved backward (right) together with the hammer shank 15a and are inserted in the case 50 through a slit hole 51 formed in the case 50, thereby sequentially shielding light from the focusing lenses 47B and 47A.

A key information sensor 60 is arranged in the action mechanism 7 to detect depression itself of key 3. The key information sensor 60 has substantially the same arrangement as that of the performance information sensor 40. The sensor 60 is arranged on the lower end of the bracket and the lower surface of the wippen 10. The transmission and reception optical fibers comprise a pair of fibers. A shutter 61 mounted on the wippen 10 is arranged to shield an optical path between the transmission optical fiber and the opposing reception optical fiber.

Reference numeral 63 denotes a case for housing the sensor heads 41A and 41B.

With the above arrangement, the mode of operation will be described wherein stick striking and key depression information is detected and recorded. The action mechanism 7 is operated in synchronism with the key 3, and the hammer 15 is pivoted backward, as indicated by the alternate long and short dashed line. The shutter 44 is inserted in the case 50 through the slit hole 51 to shield the optical path between the front focusing lenses 47B and 47BR. For this reason, light A emitted from the light-emitting element LE, transmitted through the transmission optical fiber 42b and focused by the focusing lens 47B is shielded by the shutter 61 and will not reach a reception optical fiber 42bR. In this case, the light-receiving element LR is kept off. When the hammer shank 15a is further pivoted to move the shutter 44 in the direction of arrow and the shutter 44 shields the optical path between the focusing lenses 47A and 47AR, the light from the transmission optical fiber 42a does not reach the reception optical fiber 42bR, as described above. The light-receiving element LR connected to the optical fiber 42bR is turned off. The stick striking speed or key depression speed can be detected by measuring a time interval corresponding to the OFF times of the light-receiving elements. The time interval is shortened when the speed of the hammer 15 is increased. However, when the speed of the hammer 15 is decreased, the time interval is prolonged. By measuring the time interval, the direct striking speed or the displacement speed of the hammer, i.e., the force (volume) of the striking or depression can be detected. Therefore, accurate musical performance can be reproduced by recording time interval information.

The time interval measurement can be exemplified as follows. After a counter (not shown) is reset (all clear), the counter counts clock pulses having a predetermined rate on the basis of the first OFF state detected upon transmission of light through an optical fiber 43bR. On the basis of the next OFF state detected by transmission of light through the optical fiber 42bR, the counter is stopped. This count corresponds to the time interval.

When the wippen 10 is moved upward upon depression of the key, the shutter 61 of the key information sensor 60 is moved upward together with the wippen 10 to a location above a sensor head 62, and light from the light-emitting element transmitted through the transmission optical fiber is not shielded by the shutter 61. The light-receiving element for the reception optical fiber is turned on and supplies a detection signal (key name signal and key ON-state signal) of the key to a decoder which then records the key name signal.

With the above arrangement, unlike the conventional configuration, a semiconductor sensor such as a combination of light-emitting and light-receiving elements need not be forcibly arranged in a complicated narrow space near the key and its action mechanism. Since the compact sensor, having the transmission and reception optical fibers, the sensor head with the reflecting surface for reflecting the light from the transmission optical fiber in a direction substantially perpendicular to the incident direction, the sensor head with the reflecting surface for reflecting the light from the first sensor head in a direction substantially perpendicular to the incident direction, and the shutter arranged between the sensor heads to be moved in association with the operation of the key, is arranged near the key and its action mechanism, the sensor can be easily housed in a narrow limited space. Electrical parts such as transmission and reception semiconductor elements constituting the sensor are mounted at positions of a wide space remote from the narrow space. Since optical signals are supplied to the elements through the optical fibers, the number of components in the region of the key and its action mechanism can be decreased. As a result, the structure of the key and its action mechanism can be simplified. Since the electrical components such as transmission and reception semiconductor elements are remote from the key and its action mechanism, the indispensable components of the sensor need not be jammed into a limited space, thereby increasing the margin of layout design. Such a feature of the present invention also simplifies assembly and maintenance procedures, and replacement of parts.

Figure 5:
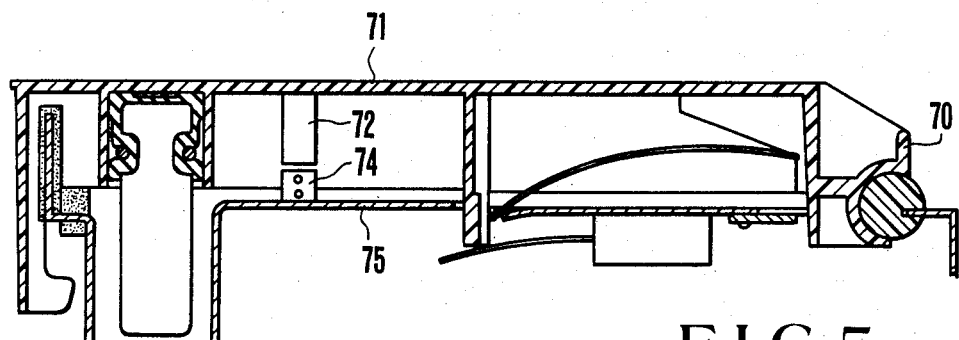
FIG. 5 is a sectional view of a keyboard when the present invention is applied to an electronic musical instrument.

The present invention is not limited to the particular embodiment described above. Various changes and modifications may be made within the spirit and scope of the invention. In the above embodiment, the displacement speed of the hammer in the action mechanism for the piano key is detected. However, the displacement speed of the key itself may be detected, as shown in FIG. 5. A shutter 72 suspends at a proper position of a plastic key 71, one end 70 of which is pivotally supported. A pair of sensor heads 73 and 74 (only the head 74 is illustrated) shown in FIGS. 2 to 4 are arranged on a frame 75 so as to interpose the shutter 72 therebetween. The optical path is shielded upon depression of the key.

Referring to FIG. 5, an additional shutter with a sensor can be included adjacent to a combination of the sensors 73 and 74 and the shutter 72. In this case, the additional shutter is suspended from the key 71 as in the case of the shutter 71, and the additional sensor is fixed to the frame. The additional sensor detects key data on ON/OFF state of the key, i.e., a key name and generates a key name signal and a key ON-state signal. Therefore, only one of the sensor heads 73 and 74 is required.

With the above arrangement, key ON/OFF data can be obtained in addition to displacement speed data.

Figure 6:
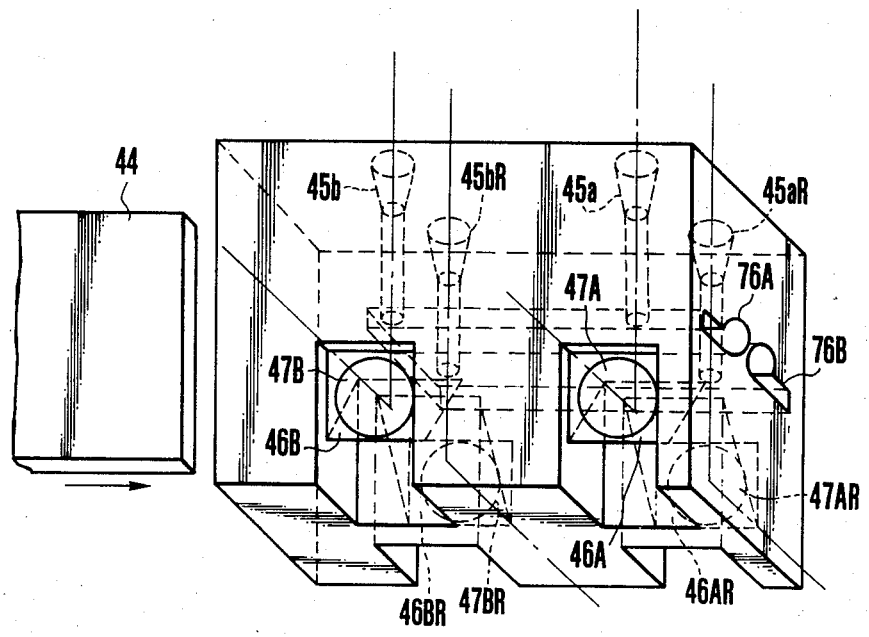
FIGS. 6 to 9 are perspective views showing modifications of the sensor of the present invention, respectively.

FIG. 6 shows still another modification of the sensor of the present invention. The same reference numerals as in FIG. 6 denote the same parts as in FIGS. 2 to 4. Referring to FIG. 6, holes 76A and 76B are formed in the upper surface of a sensor head 41 so as to reach blind holes 45a, 45b, 45aR and 45bR for receiving optical fibers. Other arrangements including the blind holes, the reflecting surfaces and the focusing lenses are the same as those in FIGS. 2 to 4, and a detailed description thereof will be omitted. The holes 76A and 76B are used to receive an adhesive. An adhesive of the same material as that of the optical fibers inserted in the blind holes and the sensor heads is used. For example, when the optical fibers and the sensor heads are made of acrylic resin, a transparent acrylic adhesive is used so that formation of an air layer having a refractive index different from that of the acrylic resin midway along the optical path from the distal ends of the optical fibers inserted in the blind holes to reflecting surfaces 46A, 46B, 46AR and 46BR, and hence light scattering is prevented. The adhesive can be replaced with an UV type adhesive or an epoxy resin adhesive.

Figure 7:
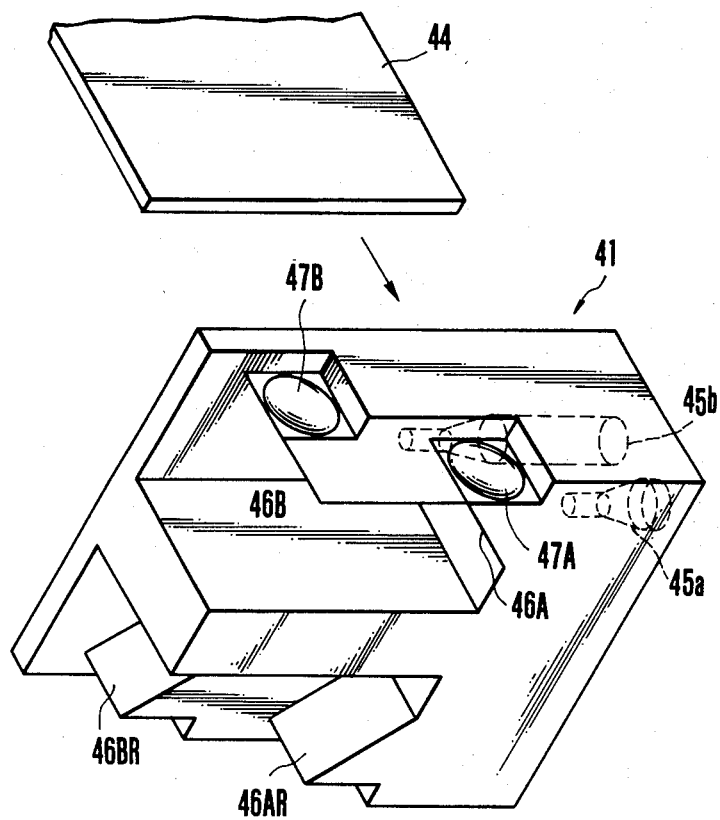

FIG. 7 shows a still another modification. The focusing lenses and the reflecting surfaces are staggered. More particularly, a focusing lens 47B and a reflecting surface 46A combined therewith are staggered from a focusing lens 47A and a reflecting surface combined therewith along the moving direction of a shutter 44. In other words, combinations of the focusing lenses and the reflecting surfaces are separated from each other along a direction perpendicular to the moving direction of the shutter. The thickness of the sensor head 41 along the moving direction of the shutter 44 can be decreased. Therefore, the sensor can be built into a grand piano having a narrower space than that of the upright piano.

Figure 8:
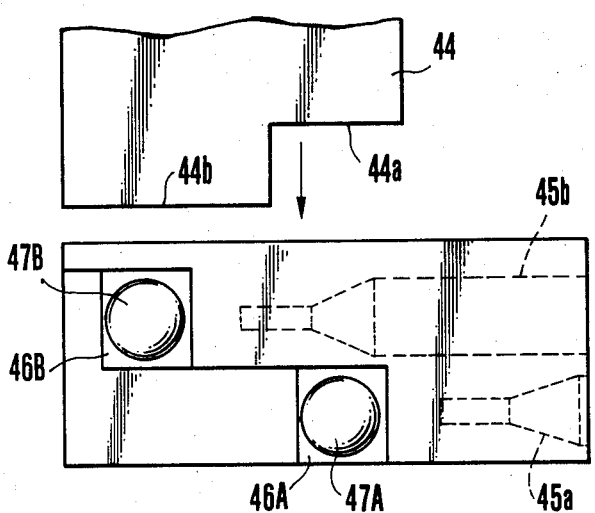

FIG. 8 shows the same sensor as in FIG. 7. However, a notch is formed in the shutter to increase a shielding time as compared with that of the shutter of FIG. 7, thereby improving measurement precision.

Figure 9:
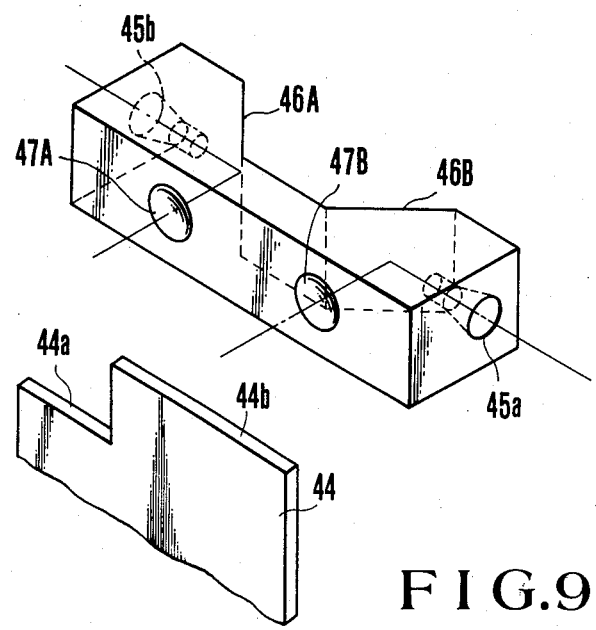

FIG. 9 shows a still another modification obtained by further developing the arrangement of FIG. 8. Sets of focusing lenses and reflecting surfaces are arranged in parallel with each other along a direction perpendicular to the moving direction of the shutter, thereby further decreasing the thickness of the sensor. In this case, the optical fibers are inserted from the side surfaces of the sensor head. In the same manner as in FIG. 8, by using the notched shutter, the shielding time interval is substantially increased.

FIGS. 10 to 12 show still another modification of the present invention. The transmission arrangement is replaced with a reflection arrangement wherein the shutter is used as a reflecting plate. Referring to FIGS. 10 to 12, the sensor comprises a sensor head 141 integrally formed of a transparent synthetic resin such as acrylic resin, two pairs of optical fibers 142 and 143, and a reflecting plate 144. Blind holes 145a and 145b each having an elliptical sectional shape are formed in one side surface 141a of the sensor head 141 to be spaced apart from each other. One end of each pair of the optical fibers 142 and 143 is inserted in a corresponding one of the blind holes 145a and 145b and is connected to the sensor head 141. In this case, one pair of optical fibers 142 comprises a transmission optical fiber, one end of which is connected to a light-emitting element LE, and a reception optical fiber 142b connected to a light-receiving element LR. Similarly, the other pair of optical fibers 143 comprise transmission and reception optical fibers 143a and 143b connected to other light-emitting and light-receiving elements LE and LR. Two reflecting surfaces 146A and 146B are formed in a side surface 141b of the sensor head 141 which is located opposite to the surface with the blind holes 145a and 145b. The reflecting surfaces 146A and 146B have an inclined angle of about 45° and guide light from the light-emitting element LE through transmission optical fibers 142a and 143a to a surface 141c of the sensor head 141. Two focusing lenses 147A and 147B are formed in the surface 141c in correspondence with the reflecting surfaces 146A and 146B, respectively. In other words, the reflecting surfaces 146A and 146B are inclined at an angle of about 45° with respect to the insertion direction of the fibers.

The sensor head having the arrangement described above is housed in the case 50 which is located at the upper end of the bracket 26 and behind the hammer shank 15a, as shown in FIG. 1. The head is located at one side of the corresponding action mechanism 7. In this case, the surface 141c of the sensor head 141 faces the corresponding action mechanism 7. At the same time, the pair of focusing lenses 147A and 147B are aligned in the case 50 along the moving direction (back-and-forth direction) of the hammer 15.

The reflecting plate 144 is mounted on the hammer shank 15a so as to correspond to the sensor head 141. Normally, the reflecting plate 144 is located in front (left) of the sensor head 141, as shown in FIG. 1. When the reflecting plate is moved backward (right) together with the hammer shank 15a upon key depression, the plate 144 enters the case 50 through the slit hole 51, thereby causing the reflecting plate 144 to sequentially oppose the focusing lenses 47B and 47A.

The action mechanism 7 is operated in synchronism with the key 3 and the hammer 15 is pivoted backward, as indicated by the alternate long and short dashed line of FIG. 1. In pivotal movement of the hammer 15, the reflecting plate 144 is entered into the case 50 through the slit hole 51. The reflecting plate 144 first opposes the front focusing lens 147B. For this reason, light A (FIG. 10) emitted from the light-emitting diode LE, transmitted through the transmission optical fiber 43a, reflected by the reflecting surface 146B and focused by the focusing lens 147B is reflected by the reflecting plate 144. The reflected light is focused again by the focusing lens 147B, reflected by the reflecting surface 146B, and guided to a reception optical fiber 143bR. The light incident on the reception optical fiber 143bR passes through the fiber 143bR and is received by the light-receiving element LR. As a result, the light-receiving element LR is turned on. Thereafter, when the hammer shank 15a is further pivoted to cause the reflecting plate 144 to move in the direction of arrow, the reflecting plate 144 opposes the rear focusing lens 147A. In the same manner as described above, light from the transmission optical fiber 143a is reflected by the reflecting plate 144. The reflected light is guided to a reception optical fiber 142bR. The light-receiving element for the fiber 142bR is turned on. A time interval between the ON states of the two light-receiving elements is measured. The time interval is short when the striking speed of the hammer 15 is increased. However, when the striking speed is decreased, the time interval is prolonged. By recording the time interval, accurate performance can be replayed.

The action mechanism 7 further has a key information sensor 60 for detecting key depression. The sensor 60 has substantially the same arrangement as that of the performance information sensor 40 and is arranged at the lower end of the bracket 26 and on the lower surface of the wippen 10, except that only one pair of optical fibers (not shown) are used, a reflecting plate 61 normally opposes a sensor head 62, and light emitted from the transmission optical fiber is reflected toward the reception optical fiber. Reference numeral 63 denotes a case for storing the sensor head 62.

When the wippen 10 is moved upward upon depression of the key, the reflecting plate 61 of the key information sensor 60 is moved upward together with the wippen 10. The reflecting plate 61 is located above the sensor head 62. Light emitted from the light-emitting diode and transmitted through the transmission optical fiber is no longer reflected by the reflecting plate 61. As a result, the voltage from the light-receiving element for the reception optical fiber is set at high level. The signal of high level is supplied as a detection signal (i.e., a key name signal) of the depressed key 3 to the decoder and is recorded therein.

According to a performance information sensor 140 having the above arrangement, the sensor is of a reflection type. The focusing lenses 147A and 147B are provided for two pairs of optical fibers 142 and 143, respectively. Unlike the conventional sensor wherein the focusing lens is provided for each optical fiber, the number of lenses can be reduced to half, thereby simplifying the structure of the sensor head 141. Therefore, the molds for the sensor head 141 can be easily prepared, and manufacturing cost can be greatly decreased. Since a small number of lenses is used, the sensor head 141 itself can be made compact.

Figure 13:
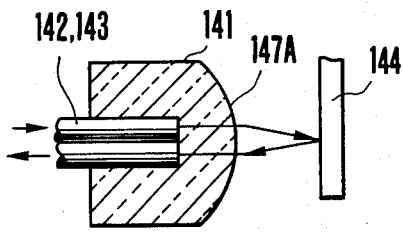
FIGS. 13 and 14 are sectional views showing still other modifications of the sensor according to the present invention.
Figure 14:
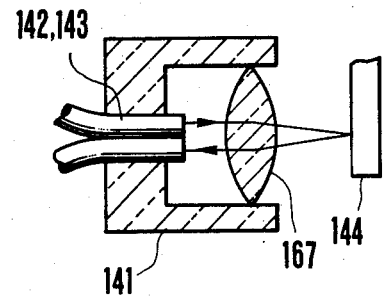

In the above embodiment, the reflecting surfaces 146A and 146B are formed in the sensor head 141, and the transmission direction of the light A is changed. However, as shown in FIG. 13, a focusing lens 147A may be formed on the surface of the sensor head 141 which opposes the distal end of an optical fiber 142 (143). The sensor head 141 need not be used. As shown in FIG. 14, a focusing lens 147 can be arranged in correspondence with the distal end face of a pair of optical fibers 142 (143).

Figure 15:
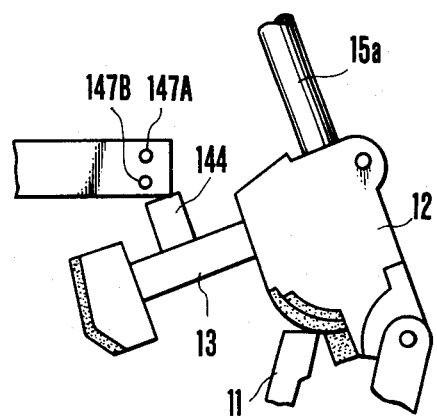
FIG. 15 is a side view showing the main part of another embodiment wherein a reflecting plate is mounted on a catcher shank in a piano.

In the above embodiments, the shutter 44 or reflecting plate 144 is mounted on the hammer shank 15a. However, the shutter or reflecting plate 144 can be mounted at any location of the hammer assembly which does not interfere with other members or mechanisms. For example, as shown in FIG. 15, the shutter or reflecting plate 144 can be mounted on the catcher shank 13. In this case, the catcher shank 13 is moved upon depression of the key, and the two pairs of optical fibers, i.e., the two focusing lenses 147A and 147B are vertically aligned to be spaced apart from each other. Furthermore, the shutter 44 or reflecting plate 144 need not be used. In this case, a light-shielding or light-reflecting function can be provided by the hammer shank itself.

The above embodiments exemplify the piano and electronic musical instrument. However, the present invention can also be applied to stick or rod displacement speed detection when a vibrating plate is struck by a movable element such as a stick for a percussion instrument. The material of the sensor head is not limited to acrylic resin or polycarbonate resin, but can be extended to a transparent material having a refractive index which is similar to that of the optical fiber.

In the embodiments in FIGS. 1 to 4, the present invention is applied to an automatic playing piano. However, signals obtained from sensors according to the present invention can be directly supplied to an electronic sound source to drive it.

What is claimed is:

1. An optical sensor for sensing displacement speed of a movable element in a musical instrument comprising:
light emitting means for emitting light;
light receiving means for receiving light;
transmission optical fiber means coupled to said light emitting means for transmitting light emitted from said light emitting means;
reception optical fiber means coupled to said light receiving means;
a plurality of sensor heads arranged in a single line each of which comprises a delivering section and a receiving section; said transmission optical fiber means being coupled to said delivering section so that light emitted by said light emitting means is transmitted to said delivering section through said transmission optical fiber means, wherein among any three adjacent sensor heads having three corresponding delivering sections and receiving sections, a delivering section of a first sensor head of said any three adjacent sensor heads delivers light transmitted thereto by said transmission optical fiber means to a receiving section of a second sensor head of said any three adjacent sensor heads while the receiving section of said first sensor head receives light delivered thereto by a delivering section of a third sensor head of said any three adjacent sensor heads such that said delivered light is supplied to said light receiving means through said reception optical fiber means, said transmission optical fiber means comprising first and second transmission optical fibers which are fitted to said delivering section spaced a predetermined distance apart from one another, the light traveling along said first transmission optical fiber constituting a first optical path and the light traveling along said second transmission optical fiber constituting a second optical path, said reception optical fiber means comprising first and second reception optical fibers spaced a predetermined distance apart from one another; and shutter means movable in accordance with said movable element for interrupting the delivered light corresponding to said first transmission optical fiber firstly thereby effectuating a first interruption and thereafter for interrupting the delivered light corresponding to said second transmission optical fiber thereby effectuating a next interruption so that displacement speed of said movable element is obtained by measuring a time interval between said first interruption and said next interruption.

2. An optical sensor for sensing displacement speed of a movable element in a musical instrument according to claim 1, wherein said sensor heads comprise a transparent material.

3. An optical sensor for sensing displacement speed of a movable element in a musical instrument according to claim 1, wherein said delivering section comprises a focusing lens for outputting said outputted light in the same direction.

4. An optical sensor for sensing displacement speed of a movable element in a musical instrument according to claim 1, wherein said receiving section comprises a focusing lens for focusing said outputted light.

5. An optical sensor for sensing displacement speed of a movable element in a musical instrument according to claim 1, wherein said delivering section comprises reflecting surface for reflecting the light supplied from said light emitting means in a predetermined direction.

6. An optical sensor for sensing displacement speed of a movable element in a musical instrument according to claim 1, wherein said delivering section comprises reflecting surface for reflecting said outputted light in a predetermined direction.

7. An optical sensor for sensing displacement speed of a movable element in a musical instrument according to claim 1, wherein said movable element comprises a key.

8. An optical sensor for sensing displacement speed of a movable element in a musical instrument according to claim 7, wherein one of said plurality of sensor heads and said shutter means correspond to said key and are disposed under said key.

9. An optical sensor for sensing displacement speed of a movable element in a musical instrument according to claim 1, wherein said movable element comprises one member of an action mechanism in a piano.

10. An optical sensor for sensing displacement speed of a movable element in a musical instrument according to claim 9 wherein said one member is said shutter means.

11. An optical sensor for sensing displacement speed of a movable element in a musical instrument according to claim 1, wherein said shutter means is stepped, so that a first step of said shutter means corresponds to said first optical path and a second step of said shutter means corresponds to said second optical path.

12. An optical sensor for sensing displacement of a movable element in a musical instrument comprising:
light emitting means for emitting light;
light receiving means for receiving light;
transmission optical fiber means coupled to said light emitting means for transmitting the light emitted from said light emitting means;
reception optical fiber means coupled to said light receiving means;
a plurality of sensor heads arranged in a single line, each of which comprises an output section connected to said light emitting means through said transmission optical fiber means, and an input section connected to said light receiving means through said reception optical fiber means, said output section outputting to the input section of an adjacent sensor head the light emitted from said light emitting means through said transmission optical fiber means and input section inputting the outputted light from the output section of another adjacent sensor head and supplying said outputted light to said light receiving means through said reception optical fiber means, said transmission optical fiber means and said reception optical fiber means being fitted to said output section and said input section, respectively, a predetermined distance apart; and shutter means for interrupting said outputted light in accordance with displacement of said movable element so that when said movable element is moved, displacement thereof is sensed.

13. An optical sensor for sensing displacement of a movable element in a musical instrument according to claim 12, wherein said sensor heads comprise a transparent material.

14. An optical sensor for sensing displacement of a movable element in a musical instrument according to claim 12, wherein said output section comprises a focusing lens for outputting said outputted light in the same direction.

15. An optical sensor for sensing displacement of a movable element in a musical instrument according to claim 12, wherein said input section comprises a focusing lens for focusing said outputted light.

16. An optical sensor for sensing displacement of a movable element in a musical instrument according to claim 12, wherein said output section comprises reflecting surface for reflecting the light supplied from said light emitting means in a predetermined direction.

17. An optical sensor for sensing displacement of a movable element in a musical instrument according to claim 12, wherein said input section comprises reflecting surface for reflecting said outputted light in a predetermined direction.

18. An optical sensor for sensing displacement of a movable element in a musical instrument according to claim 12, wherein said movable element comprises a key.

19. An optical sensor for sensing displacement of a movable element in a musical instrument according to claim 18, wherein one of said plurality of sensor heads and said shutter means corresponding to said key and disposed under said key.

20. An optical sensor for sensing displacement of a movable element in a musical instrument according to claim 12, wherein said movable element comprises one member of an action mechanism, said movable element and said action mechanism being disposed within the same plane.

21. An optical sensor for sensing displacement of a movable element in a musical instrument according to claim 12, wherein said one member is said shutter means.

22. An optical sensor for sensing displacement speed of a movable element in a musical instrument comprising:
light emitting means for emitting light;
light receiving means for receiving light;
light reflecting means for reflecting the emitted light;
transmission optical fiber means coupled to said light emitting means for transmitting said emitted light;

reception optical fiber means coupled to said light receiving means;

sensor head means, connected to said light emitting means through said transmission optical fiber means and to said light receiving means through said reception optical fiber means, said sensor head means having an output/input section for outputting said emitted light through said transmission optical fiber means and for receiving reflected light which is a reflection of said emitted light outputted to said light reflecting means; and which is reflected therefrom said transmission optical fiber means and said reception optical fiber means being coupled to said output/input section;

said light reflecting means moving in accordance with said movable element to reflect the outputted light corresponding to said first transmission fiber firstly thereby constituting a first reflection and thereafter to reflect the outputted light corresponding to said second transmission fiber thereby constituting a next reflection so that displacement speed of said movable element is obtained by measuring a time interval between said next reflection.

23. An optical sensor for sensing displacement speed of a movable element in a musical instrument according to claim 22, wherein said sensor head means comprise a transparent material.

24. An optical sensor for sensing displacement speed of a movable element in a musical instrument according to claim 22, wherein said output section comprises a focusing lens for outputting said outputted light.

25. An optical sensor for sensing displacement speed of a movable element in a musical instrument according to claim 22, wherein said input section comprises a focusing lens for focusing said outputted light.

26. An optical sensor for sensing displacement speed of a movable element in a musical instrument according to claim 22, wherein said output section comprises a reflecting surface for reflecting the light supplied from said light emitting means in a predetermined direction.

27. An optical sensor for sensing displacement speed of a movable element in a musical instrument according to claim 22, wherein said input section comprises a reflecting surface for reflecting said outputted light in a predetermined direction.

28. An optical sensor for sensing displacement speed of a movable element in a musical instrument according to claim 22, wherein said movable element comprises a key.

29. An optical sensor for sensing displacement speed of a movable element in a musical instrument according to claim 28, wherein said sensor head means and said reflecting means correspond to and are disposed under said key.

30. An optical sensor for sensing displacement speed of a movable element in a musical instrument according to claim 22, wherein said movable element comprises one member of an action mechanism in a piano.

31. An optical sensor for sensing displacement speed of a movable element in a musical instrument according to claim 22, wherein said one member is said reflecting means.

32. An optical sensor for sensing displacement speed of a movable element in a musical instrument according to claim 22, wherein said reflecting means is stepped, so that first and second steps of said reflecting means corresponds, respectively, to said first and second optical paths.

33. An optical sensor for sensing displacement of a movable element in a musical instrument comprising:
light emitting means for emitting light;
light receiving means for receiving light;
light reflecting means for reflecting the emitted light;
transmission optical fiber means coupled to said light receiving means for transmitting said emitted light;
reception optical fiber means coupled to said light receiving means;
sensor head means, connected to said light emitting means through said transmission optical fiber means and to said light receiving means through said reception optical fiber means, said sensor head means having an output/input section for outputting said emitted light through said transmission optical fiber means and for receiving reflecting light which is a reflection of the light outputted to said light reflecting means, said transmission optical fiber means and said reception optical fiber means being coupled to said output/input section;
said light reflection means moving in accordance with displacement of said movable element to reflect the outputted light when said movable element is moved so that, displacement of said movable element is sensed.

34. An optical sensor for sensing displacement of a movable element in a musical instrument according to claim 33, wherein said sensor head means comprise a transparent material.

35. An optical sensor for sensing displacement of a movable element in a musical instrument according to claim 33, wherein said output section comprises a focusing lens for outputting said outputted light.

36. An optical sensor for sensing displacement of a movable element in a musical instrument according to claim 33, wherein said input section comprises a focusing lens for focusing said outputted light.

37. An optical sensor for sensing displacement of a movable element in a musical instrument according to claim 33, wherein said output section comprises a reflecting surface for reflecting the light supplied from said light emitting means in a predetermined direction.

38. An optical sensor for sensing displacement of a movable element in a musical instrument according to claim 33, wherein said input section comprises a reflecting surface for reflecting said outputted light in a predetermined direction.

39. An optical sensor for sensing displacement of a movable element in a musical instrument according to claim 33, wherein said movable element comprises a key.

40. An optical sensor for sensing displacement of a movable element in a musical instrument according to claim 39, wherein said sensor head means and said reflecting means correspond to and are disposed under said key.

41. An optical sensor for sensing displacement of a movable element in a musical instrument according to claim 33, wherein said movable element comprises one member of an action mechanism in a piano.

42. An optical sensor for sensing displacement of a movable element in a musical instrument according to claim 33, wherein said one member is said reflecting means.

* * * * *